L. MORGENTHAU.
MEDICATED CANDY.

No. 47,504.   Patented Apr. 25, 1865.

Witnesses:

Inventor:

UNITED STATES PATENT OFFICE.

LAZARUS MORGENTHAU, OF MANNHEIM, BADEN.

IMPROVED MEDICATED CANDY.

Specification forming part of Letters Patent No. 47,504, dated April 25, 1865.

*To all whom it may concern:*

Be it known that I, LAZARUS MORGENTHAU, of Mannheim, in the Grand Duchy of Baden, have invented an Improvement in the Manufacture of Medicated Candy, prepared with a view to the obtaining of Letters Patent of the United States therefor, the article, when patented, to be known in trade under the name of "Pine Balsam Sugar or Fichtennadel Candy."

The invention consists in connecting with the sugar out of which I manufacture candy a preparation derived from the shoots of the pine tree, gathered in spring or summer, and made into either an extract, essence, or oil, in the manner set forth in my patent of the United States for fichtennadel preparations and cigars, dated March 14, 1865, and numbered 46,855. The essence, extract, or oil used in the manufacture of the cigars and in the manufacture of the candy is precisely the same.

*Manufacture of the medicated candy to be known in trade under the name of "pine balsam sugar."*—

Five pounds of the best refined cane-sugar is dissolved in one pound of distilled water. After being dissolved, the same is put in a copper kettle and placed over a coal fire. When it boils, one-fifteenth ($\frac{1}{15}$) part of a pound of tartaric acid is added to the same. This addition is made for the purpose of preventing the sugar from changing or crystallizing. The sugar must continue to boil until every vestige of water has left it, and this is ascertained in the usual manner, a wet iron rod being dipped into the boiling sugar and removed. If the sugar sticks to the rod and hardens on being placed in cold water to the extent that on being removed from the rod the sugar breaks like glass, then the water has entirely evaporated and the kettle may be removed from the fire. If not, the sugar must continue to boil until a trial with the rod, as above mentioned, proves successful. Immediately after removing the kettle from the fire a mixture consisting of four and one-half ($4\frac{1}{2}$) loth fichtennadel extract, two and one-half ($2\frac{1}{2}$) loth fichtennadel essence, and one and one-half ($1\frac{1}{2}$) loth of fichtennadel oil is poured into the liquid sugar, and after being well stirred the same is poured on a large marble slab for the purpose of gradually cooling. The sugar, upon cooling, takes the consistency of dough, and is then placed on a board covered with zinc. The sugar is thereupon formed into shape by means of the machine represented in the accompanying drawings, in which—

Figure 1:
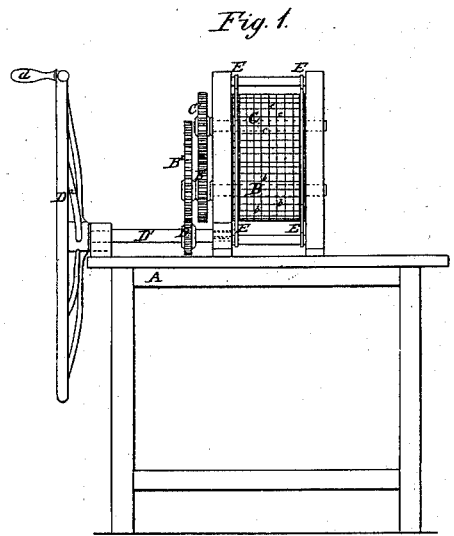
Figure 2:
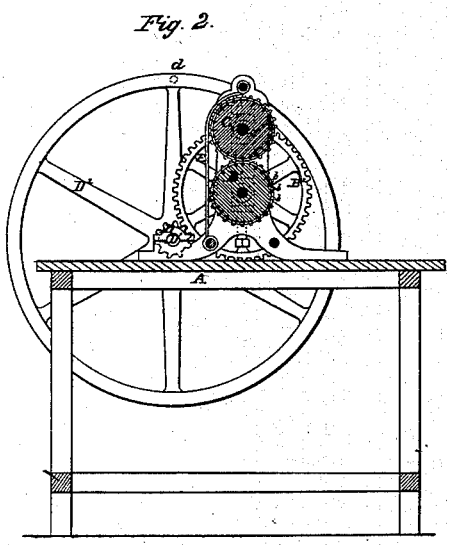
Figure 3:
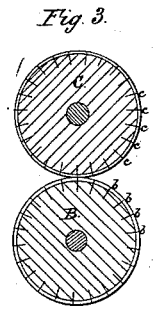

Figure 1 is a face view, and Fig. 2 an end view. Fig. 3 is an end view of the rollers on a larger scale.

Similar letters of reference indicate like parts in all the figures.

A is the framing, and B and C are metal rollers nicely finished, with projections $b$ and $c$ adapted to impress sharp grooves in the sheets of sugar passed through.

B' and C' are gear-wheels on the shafts of B and C, respectively.

$B^2$ is a larger gear-wheel on the extended shaft of B, and D is a small gear-wheel on a separate shaft, D', which is turned by the aid of a crank or handle, $d$, on the fly-wheel $D^2$. The sheets of plastic sugar being introduced between the guides E, so as to be seized by the rolls B C, and the crank $d$ being turned, the sugar is drawn through and shaped into small rectangular pieces slightly connected, and ready to be separated by a slight force. The pieces, on being cooled and separated, are ready for transportation or use.

My sugar or candy thus compounded and prepared in suitable pieces to be taken in the mouth is a very desirable remedy for various serious affections of the lungs and connected parts, and is also an important aid to speakers and singers in removing hoarseness and giving tone and vigor to the vocal organs.

The extract from the pine tree may be used with either cane or grape sugar without the essence or oil. So may the essence or the oil be used alone with the sugar, and each may be used in different proportions from those here indicated, and some benefit will result from the use of the compound; but it is far preferable for most purposes to employ precisely the ingredients and the proportions above set forth.

Having now fully described my invention, what I claim as new, and desire to secure by Letters Patent, is as follows:

1. The combination of sugar with an extract from the young shoots of the pine tree, substantially in the manner and for the purpose herein set forth.

2. The compound formed of the several specific ingredients, in the proportions herein set forth.

In testimony whereof I have hereunto set my hand in the presence of two subscribing witnesses.

LAZARUS MORGENTHAU.

Witnesses:
GEORGE HÜTHER,
A. OHNESARY.